J. HAYNES.
Hand-Saw.
No. 1,526.
Reissued Aug. 25, 1863.
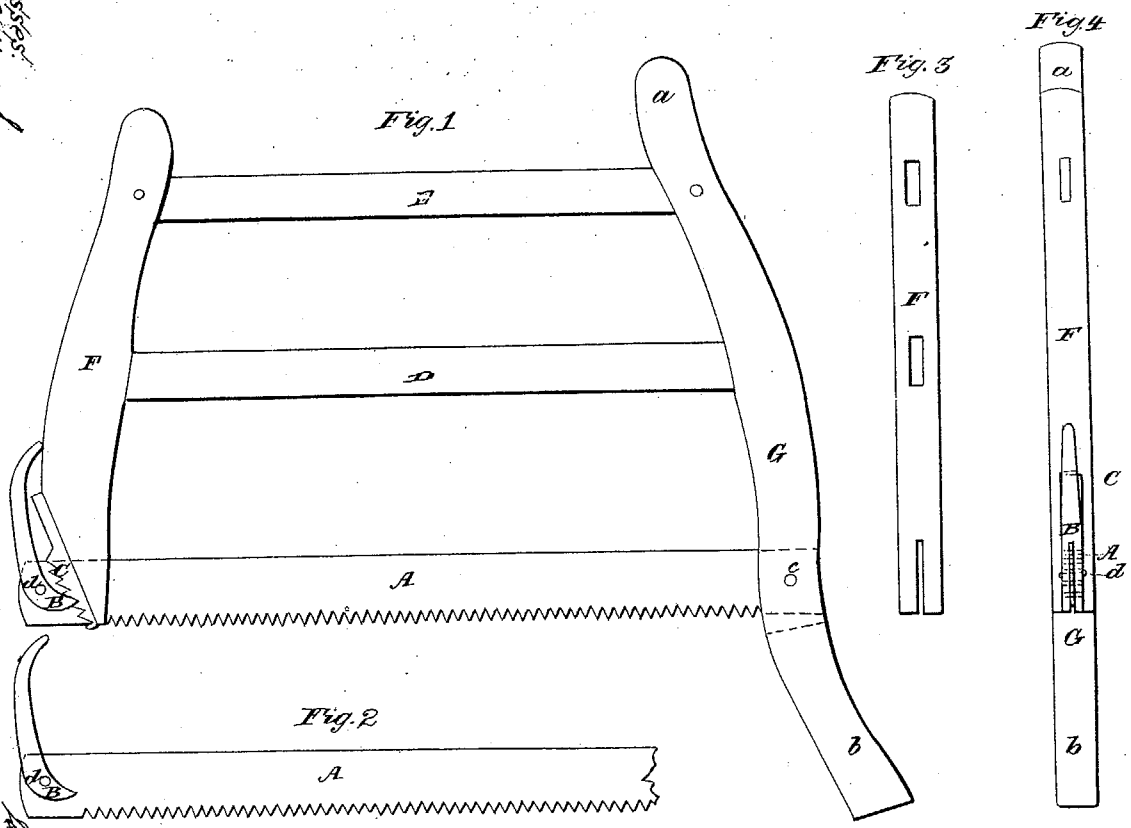
Witnesses:
F. Abbalsi
Frederick Curtis
Inventor:
James Haynes
by his attorney
R. H. Eddy
N. PETERS, PHOTO-LITHOGRAPHER, WASHINGTON, D. C.

BEST AVAILABLE COPY

UNITED STATES PATENT OFFICE.

JAMES HAYNES, OF HOLLIS, MAINE.

IMPROVED WOOD-SAW FRAME.

Specification forming part of Letters Patent No. 25,015, dated August 9, 1859; Reissue No. 1,526, dated August 25, 1863.

*To all whom it may concern:*

Be it known that I, JAMES HAYNES, a resident of Hollis, in the county of York and State of Maine, have made a new and useful Invention having reference to the common Wood-Saw; and I do hereby declare the same to be fully described in the following specification and represented in the accompanying drawings, of which—

Figure 1 is a side elevation of a wood-saw provided with my invention. Fig. 2 is a side view of the saw-blade and its strainer or straining-lever. Fig. 3 is an inner edge view of that end bar of the saw-frame which carries the inclined rack. Fig. 4 is a front end elevation of the saw-frame and the straining mechanism thereof.

The old or common saw-frame has usually co sisted of the handle and end bars united by a single cross-bar framed or tenoned into th m. The straining mechanism of this frame either consisted of an endless twisted cord and a stick or lever for effecting the twist, or of an iron or metallic rod provided with a head at one end and a screw and nut at the other.

My improved saw-frame not only has a different construction, but a different straining mechanism, the latter, as hereinafter described, being applied directly to the saw and the end bar of the frame. In the said improved saw-frame the middle piece or thrust-bar, like that of the ordinary saw-frame, is framed or tenoned into the handle-bar and front or end bar of the frame, and at or near the upper ends of the said two bars, instead of an iron rod with a screw, or a twisted cord and lever, there is a tension-bar, which is also tenoned or otherwise properly fastened to the two bars connected by it.

In the drawings, G is the handle-bar, of which *a* and *b* are the handles. F is the front bar, or the fellow of the handle-bar. D is the thrust-bar, E the tension-bar, and A the saw blade or plate. The said saw-blade, at or near one end, extends either into or through the handle-bar, t and is held in place by a pin, *c*, which goes laterally through both, the saw-blade being capable of turning on the pin. At its other end the saw-blade extends into the fork of a lever or strainer, B, which is arranged with respect to the blade and connected with it by a fulcrumr or pin, *d*, which goes laterally through them. An incliner or inclined-plane rack, or "ratchet," as it may also be called, C, is fastened to the lower part of the front bar, E, which is sloped off to form a seat for the rack and to give to it its proper inclined position. The inclination of the rack may, however, be otherwise obtained—that is, by forming the rack thicker or wider at the top than at its bottom, or by doing this and inclining its seat more or less, in order that the range of teeth of the rack may make in manner as shown in Fig. 1 an obtuse angle with the lower edge of the saw-blade. The lower part of the strainer is formed with one or more teeth to enter the rack. The rack and fulcrum of the strainer should be so arranged that during a portion of the upward movement of the longer arm of the strainer the action of the shorter arm against the rack or any tooth thereof shall be such as to cause the saw-blade to be pulled or strained lengthwise, the force of tension subsequently serving to maintain the upper end of the said longer arm close against the saw-frame.

The inclined plane of the rack or its inclination or angular position with respect to the lower edge of the saw-blade is an important feature or part of the straining mechanism as by means of it the strain may be increased by changing the lever from one to another notch or tooth of the rack. The rack, its inclined plane or position, and the strainer or lever applied as described, constitute the straining mechanism of my said saw frame.

In respect to the frame, the top or tension bar, as applied and used therein, in conjunction with the thrust bar and a straining mechanism, separate from such tension-bar, imparts to such frame important advantages. It operates to so strengthen the frame as to prevent that rocking of the frame and consequent twisting of the saw while at work or in use which is so likely to take place when the center-bar works loosely in arms or handle and front bars of the frame, and the straining contrivance is a twisted rope or a rod run loosely through the said bars and provided with a screw and nut. The top or tension bar and the central or thrust bar, by their peculiar connection with end bars insure that steadiness to the saw by which its cut is kept in one plane, and the saw thereby prevented from binding in the cut or kerf made by it.

I therefore claim as an improvement—

A wood-saw frame, as made with a wooden top cross-bar, E, tenoned or firmly fastened in the frame, and combined with the central or bottom wooden bar, D, the wooden front and handle bars F G, the saw-blade, and a straining mechanism separate from such top bar, or employed and to operate substantially as described.

2. The improved straining mechanism substantially as described, the same consisting of the inclined plane, the rack, and strainer or lever arranged and combined with the saw-blade and its frame, as specified.

JAMES HAYNES.

Witnesses:
JOHN M. HUTCHINSON,
C. E. WELD.